(12) United States Patent
Holland et al.

(10) Patent No.: US 10,789,877 B2
(45) Date of Patent: *Sep. 29, 2020

(54) ADJUSTABLE UNDERRUN OUTPUTS

(71) Applicant: APPLE INC., Cupertino, CA (US)

(72) Inventors: Peter F. Holland, Los Gatos, CA (US); Mahesh B. Chappalli, San Jose, CA (US); Hari Ganesh R. Thirunageswaram, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,952

(22) Filed: Jul. 18, 2019

(65) Prior Publication Data

US 2019/0340971 A1 Nov. 7, 2019

Related U.S. Application Data

(63) Continuation of application No. 15/654,501, filed on Jul. 19, 2017, now Pat. No. 10,410,575.

(51) Int. Cl.
| | |
|---|---|
| *G09G 3/20* | (2006.01) |
| *G09G 5/00* | (2006.01) |
| *G06T 1/20* | (2006.01) |
| *G06F 3/14* | (2006.01) |

(52) U.S. Cl.
CPC ............ *G09G 3/2096* (2013.01); *G06F 3/14* (2013.01); *G06T 1/20* (2013.01); *G09G 3/2092* (2013.01); *G09G 5/003* (2013.01); *G09G 5/005* (2013.01); *G09G 2340/0435* (2013.01); *G09G 2350/00* (2013.01); *G09G 2370/08* (2013.01)

(58) Field of Classification Search
CPC .... G09G 3/2096; G09G 3/2092; G09G 5/005; G09G 5/003; G09G 2340/0435; G06T 1/20; G06F 3/14
See application file for complete search history.

(56) References Cited

U.S. PATENT DOCUMENTS

| | | | |
|---|---|---|---|
| 5,990,506 A | 11/1999 | Fossum et al. | |
| 6,049,394 A * | 4/2000 | Fukushima | G06K 15/02 358/1.15 |
| 6,395,576 B1 * | 5/2002 | Chang | H01L 27/14609 257/E27.132 |
| 6,583,887 B1 | 6/2003 | Clouthier et al. | |
| 8,675,004 B2 | 3/2014 | Bratt et al. | |
| 9,336,563 B2 | 5/2016 | Bratt et al. | |
| 10,055,809 B2 | 8/2018 | Holland et al. | |
| 10,410,575 B2 * | 9/2019 | Holland | G06F 3/14 |
| 2002/0106136 A1 | 8/2002 | Oka et al. | |

(Continued)

*Primary Examiner* — Mekonen T Bekele
(74) *Attorney, Agent, or Firm* — Fletcher Yoder P.C.

(57) ABSTRACT

Devices and methods for underrun compensation are provided. By way of example, a technique for underrun compensation includes determining a particular one of a plurality of pixel configurations for a display. When an underrun condition is detected during processing of first image data via an image processing pipeline, at least a portion of requested image data for downstream processing has not yet been provided by an upstream processing component. Accordingly, upon detecting an underrun condition, underrun pixel data for the at least portion of the requested image data is generated, based upon the particular one of the plurality of pixel configurations.

20 Claims, 9 Drawing Sheets

(56) References Cited

U.S. PATENT DOCUMENTS

| | | |
|---|---|---|
| 2002/0109693 A1 | 8/2002 | Champion et al. |
| 2006/0208981 A1* | 9/2006 | Rho .................. G02F 1/133514 345/88 |
| 2006/0262055 A1* | 11/2006 | Takahara .......... H01L 27/14643 345/81 |
| 2011/0169849 A1* | 7/2011 | Bratt ......................... G06T 1/60 345/545 |
| 2014/0139535 A1 | 5/2014 | Bratt et al. |
| 2016/0217592 A1 | 7/2016 | Croxford et al. |
| 2017/0323419 A1* | 11/2017 | Holland ................... G06T 1/60 |

* cited by examiner

ADJUSTABLE UNDERRUN OUTPUTS

CROSS-REFERENCE TO RELATED APPLICATIONS

This application is a continuation of U.S. application Ser. No. 15/654,501, filed Jul. 19, 2017, entitled "Adjustable Underrun Outputs," which is incorporated herein by reference in its entirety.

BACKGROUND

The present disclosure relates generally to image data buffering, and more particularly, to enhanced buffer outputs when data underrun conditions are present in electronic displays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays (e.g., liquid crystal displays (LCDs)) are commonly used as screens or displays for a wide variety of electronic devices, including such consumer electronics as televisions, computers, and handheld devices (e.g., cellular telephones, audio and video players, gaming systems, and so forth). Such display devices typically provide a flat display in a relatively thin and low weight package that is suitable for use in a variety of electronic goods. In addition, such display devices typically use less power than comparable display technologies, making them suitable for use in battery powered devices or in other contexts where it is desirable to minimize power usage.

Display devices typically include thousands (e.g., or millions) of picture elements, e.g., pixels, arranged in rows and columns. For any given pixel of a display device, the amount of light that viewable on the display depends on the voltage applied to the pixel. To display a given color at a given pixel, the display device may receive a set of bits of image data, whereby portions of the set of bits of data correspond to each of the pixel colors. The image data may be derived via a processing pipeline containing multiple processing blocks that enhance the image data. For example, a first block (e.g., a dithering block that applies varying shades of color in a group of adjacent pixels to "trick" the human eye into perceiving the desired color, despite the fact that none of the pixels may be actually displaying the desired color) may process the image data (e.g., by provide a dithering effect to the image data) and pass, via a first-in-first-out (FIFO) buffer, a processed output to a second, downstream, processing block for further processing.

However, when the second processing block requests the image data before it is available in the FIFO buffer, an underrun condition may occur. The FIFO buffer may still output image data to the second processing block, where the "un-ready" portions of the image data may be interpolated or gap-filled. For example, when operating in a color mode, the FIFO buffer may output image data corresponding with a designated underrun color. ON the other hand, when operating in a repeat mode, the FIFO buffer may output a repeat of previous image data.

Different display panel types may include different pixel configurations. Accordingly, it may be useful to provide different underrun color definition schemes based upon an identified display panel type.

SUMMARY

Certain aspects commensurate with certain disclosed embodiments are set forth below. It should be understood that these aspects are presented merely to provide the reader with a brief summary of the disclosure and that these aspects are not intended to limit the scope of the disclosure or the claims. Indeed, the disclosure and claims may encompass a variety of aspects that may not be set forth below.

Devices and methods for reducing or eliminating spatiotemporal dithering image artifacts are provided. By way of example, a method includes providing positive polarity and negative polarity data signals to a plurality of pixels of a display during a first frame period, in which the first frame period corresponds a first spatiotemporal rotation phase. The method includes providing the positive polarity signals and the negative polarity signals to the plurality of pixels of the display during a second frame period, in which the second frame period corresponds a second spatiotemporal rotation phase. A spatiotemporal rotation phase sequence provided to the display comprises the first spatiotemporal rotation phase and the second spatiotemporal rotation phase. One of the first spatiotemporal rotation phase and the second spatiotemporal rotation phase of the spatiotemporal rotation phase sequence is altered during the first frame period or the second time period.

BRIEF DESCRIPTION OF THE DRAWINGS

Advantages of the disclosure may become apparent upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to buffer underrun handing. More specifically, the current disclosure relates to underrun color definition for a plurality display panel types and/or pixel line color configurations. In certain embodiments, a graphics processor may be used to define an underrun color to be associated with underrun image data, upon underrun conditions occurring in image processing pipeline. Specifically, the underrun color may be defined based upon a particular display panel pixel color configuration (e.g., at the display panel level and/or at a particular line of the display panel).

Figure 1:
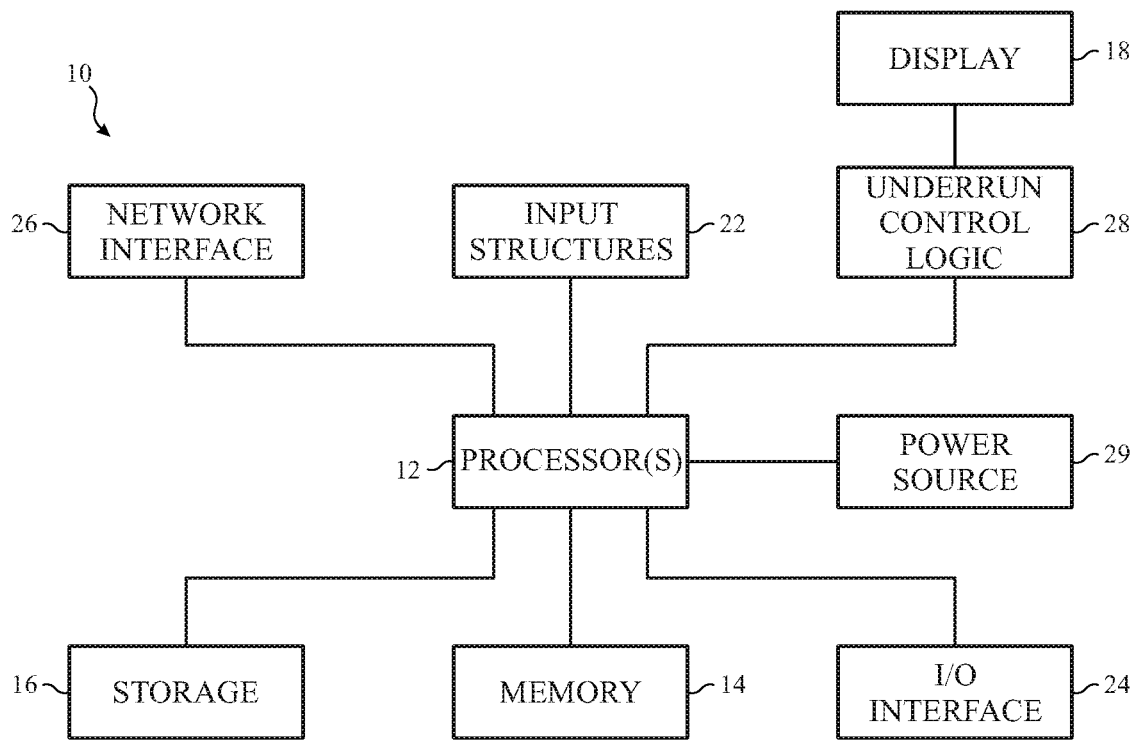
FIG. 1 is a schematic block diagram of an electronic device including display control circuitry, in accordance with an embodiment.

With these features in mind, a general description of suitable electronic devices that may implement dynamic underrun color. Turning first to FIG. 1, an electronic device 10 according to an embodiment of the present disclosure may include, among other things, one or more processor(s) 12, memory 14, nonvolatile storage 16, a display 18 input structures 22, an input/output (e.g., I/O) interface 24, network interfaces 26, underrun control logic 28, and a power source 29. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
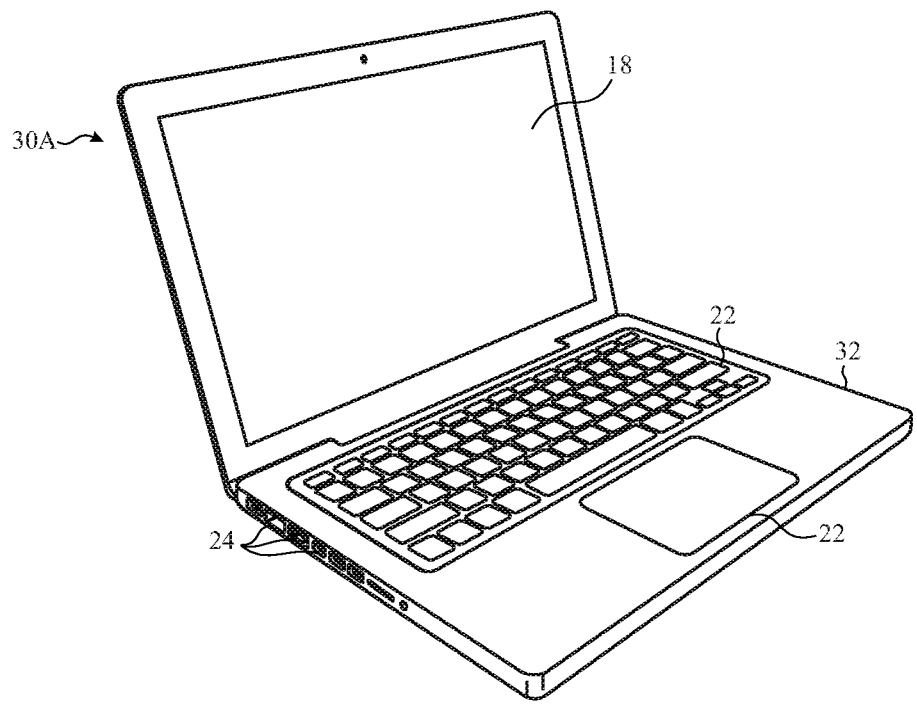
FIG. 2 is a perspective view of a notebook computer representing an embodiment of the electronic device of FIG. 1, in accordance with an embodiment.
Figure 3:
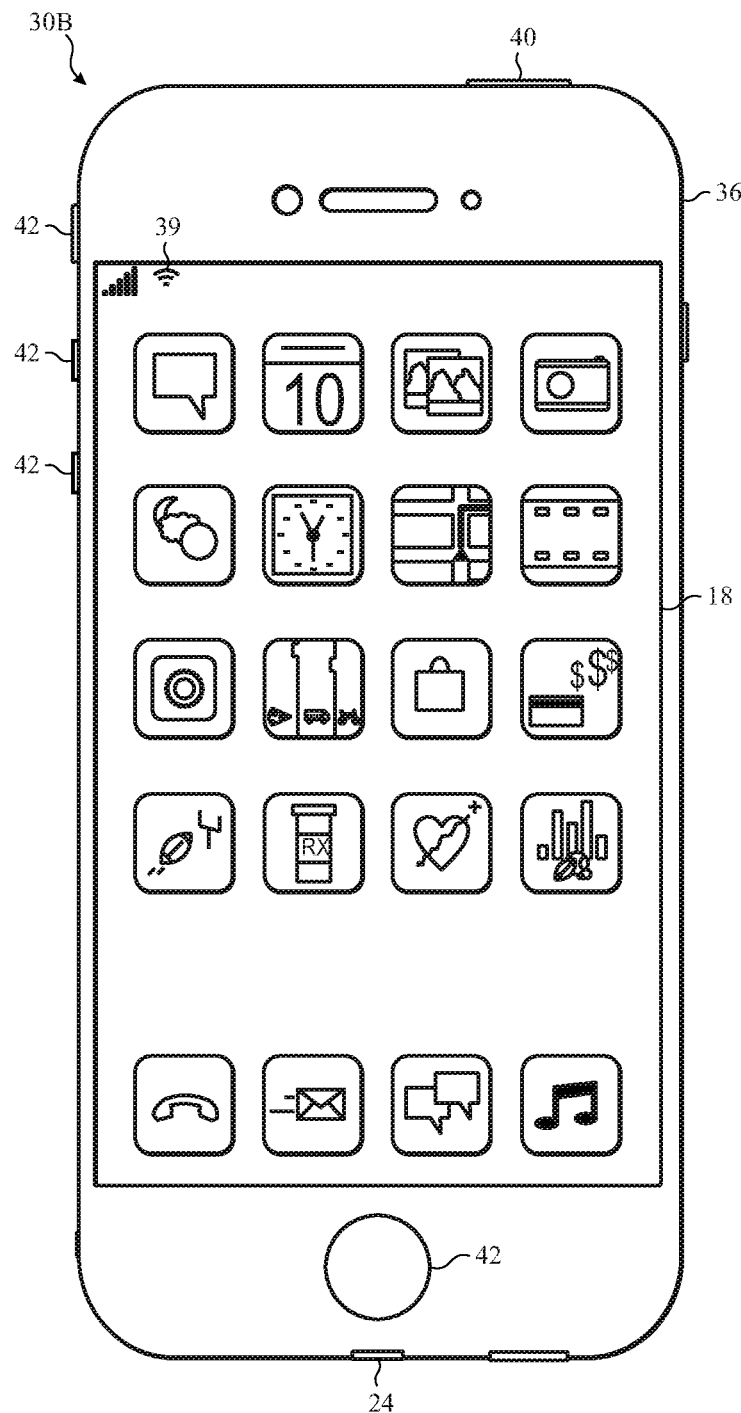
FIG. 3 is a front view of a hand-held device representing another embodiment of the electronic device of FIG. 1, in accordance with an embodiment.
Figure 4:
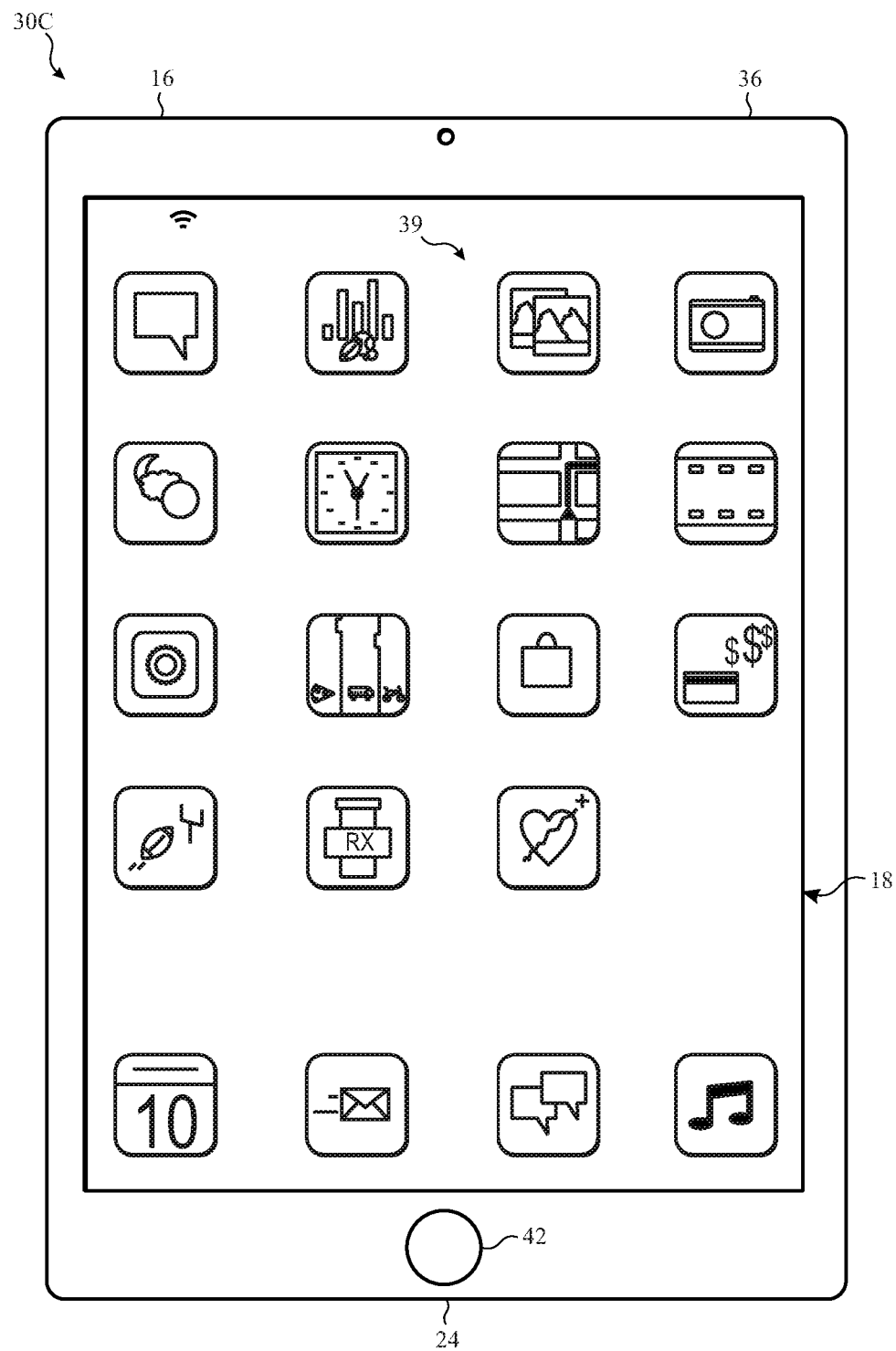
FIG. 4 is a front view of another hand-held device representing another embodiment of the electronic device of FIG. 1, in accordance with an embodiment.
Figure 5:
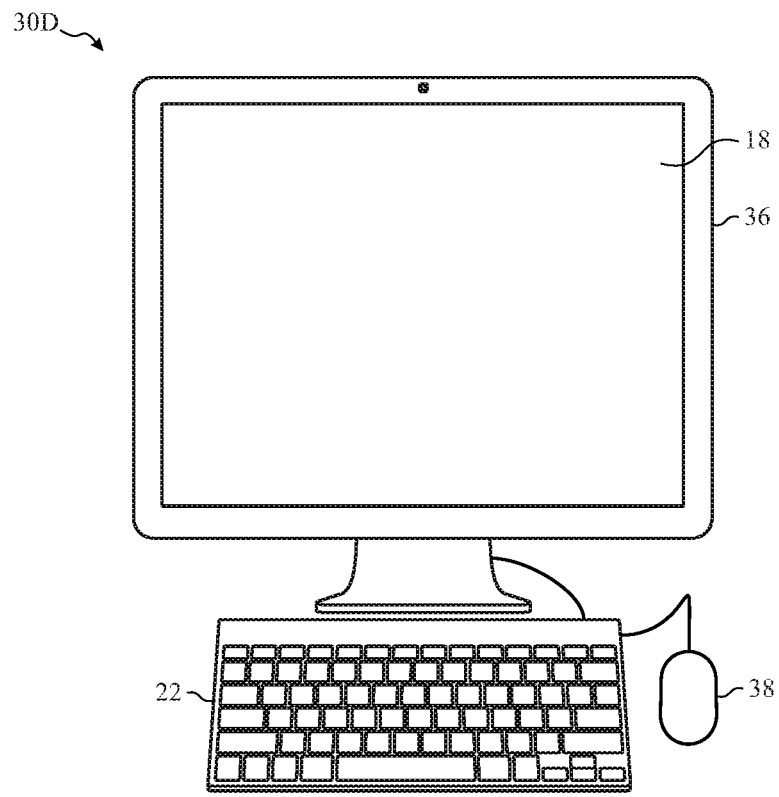
FIG. 5 is a front view of a desktop computer representing another embodiment of the electronic device of FIG. 1, in accordance with an embodiment.
Figure 6:
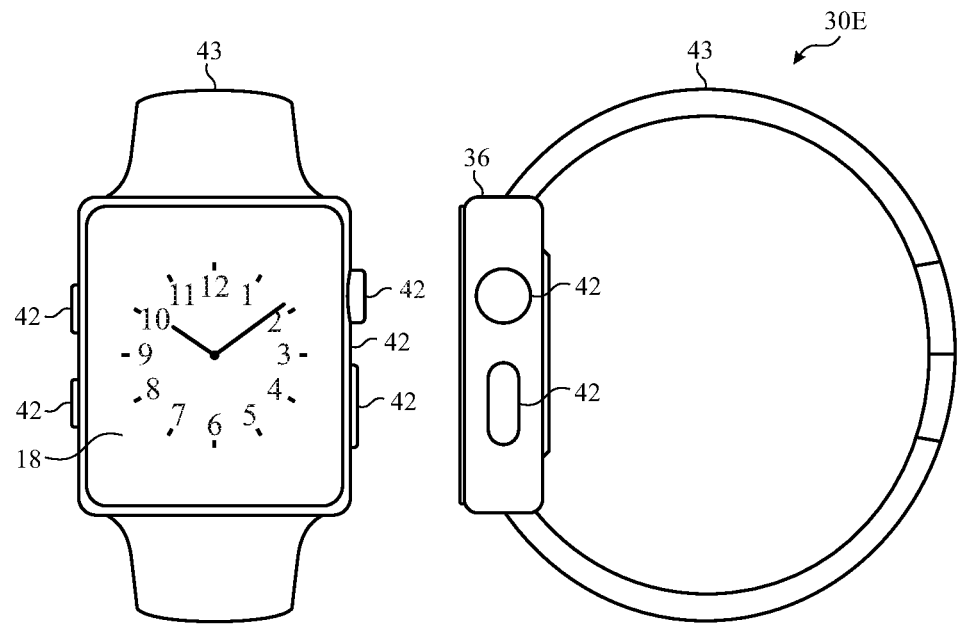
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities. In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (e.g., OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The network interface 26 may also include interfaces for, for example, broadband fixed wireless access networks (e.g., WiMAX), mobile broadband Wireless networks (e.g., mobile WiMAX), and so forth. As further illustrated, the electronic device 10 may include a power source 29. The power source 29 may include any suitable source of power, such as a rechargeable lithium polymer (e.g., Li-poly) battery and/or an alternating current (e.g., AC) power converter.

The internal components may further include underrun control logic 28. The underrun control logic 28 may be coupled to display 18 and to processor(s) 12. The underrun control logic 28 may be used to receive a data stream, for example, from processor(s) 12, indicative of an image to be represented on display 18. The underrun control logic 28 may be an application specific integrated circuit (e.g., ASIC), or any other circuitry for adjusting image data and/or generate images on display 18.

For example, in certain embodiments, the underrun control logic 28 may receive a data stream equivalent to 24 bits of data for each pixel of display 18, with 8-bits of the data stream corresponding to a level for each of the primary colors of red, blue, and green for each sub-pixel. The underrun control logic 28 may operate to convert these 24 bits of data for each pixel of display 18 to 18-bits of data for each pixel of display 18, that is, 6-bits of the data stream corresponding to a level for each of the primary colors of red, blue, and green for each sub-pixel. This conversion may, for example, include removal of the two least significant bits of each of the 8-bits of the data stream corresponding to a level for each of the primary colors of red, blue, and green. Alternatively, the conversion may, for example, include a look-up table or other means for determining which 6-bit data value should correspond to each 8-bit data input.

In underrun operations (e.g., when a read operation is requested prior to a memory buffer is filled with full pixel data), the underrun control logic 28 may provide underrun compensation. In some embodiments, the underrun control logic 28 may support a "repeat mode" where the last valid pixel data is provided as a substitution for the pixel data that has not been filled in the memory buffer. Additionally and/or alternatively, the underrun control logic 28 may support a "color mode" where an underrun color is derived for the pixel data that has not been filled in the memory buffer.

The underrun control logic 28 may support multiple pixels per clock signal. For example, in a 2 pixel/clock embodiment, two pixels may be provided as an input into the memory buffer per clock cycle. During underrun operations, one or more of the pixels of the memory buffer output may be modified to apply underrun compensation (e.g., by repeating pixel data and/or applying an underrun color to the pixel data). As will be discussed in more detail below, the underrun compensation may dynamically alter based upon the underrun mode, a display panel type (e.g., pixel configuration), and/or a pixel configuration for a particular one or more lines of the display 18.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (e.g., such as a keyboard and/or touchpad) may be used to interact with the computer 30A, such as to start, control, or operate a graphical-user-interface (GUI) or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (e.g., USB), or other similar connector and protocol.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as input structures 22 (e.g., the keyboard or mouse 38), which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, OLED display, active-matrix organic light emitting diode (e.g., AMOLED) display, and so forth), which may allow users to interact with a user interface of the wearable electronic device 30E.

Figure 7:
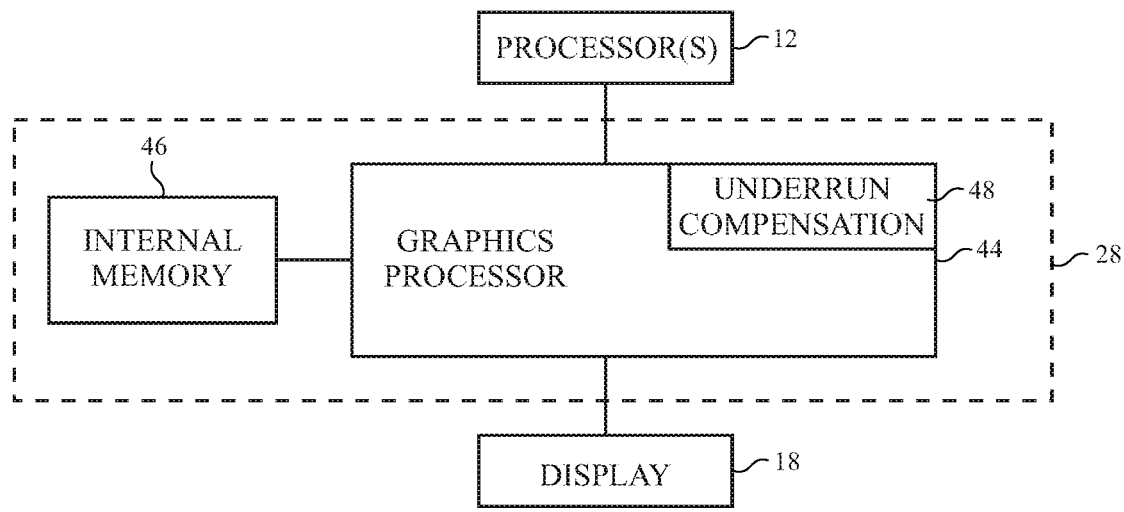
FIG. 7 is a block diagram illustrating components of display control circuitry of FIG. 1, in accordance with one embodiment.

FIG. 7 illustrates components of underrun control logic 28 of FIG. 1 in accordance with one or more embodiments. As illustrated, underrun control logic 28 may be positioned between processor(s) 12 and display 18. The underrun control logic 28 may include graphics processor 44 that may operate to generate images on display 18 of electronic device 10. The graphics processor 44 may be a device that receives pixel intensity levels from processor(s) 12 and may transmit signals corresponding to those pixel intensity levels to display 18. As set forth above, the received pixel intensity levels, e.g. an image code from processor(s) 12, may be a 24-bit data stream and the transmitted voltage levels, e.g., an image code for display on display 18, may correspond to an 18-bit data stream (e.g., when, for example, LCD is a 6-bit display). The pixel intensity levels transmitted to display 18 may be, for example, numerical levels that correspond to respective pixel intensities to be shown on display 18. The display 18 may thus receive the voltage signals from graphics processor 44 as input signals, and may produce an image corresponding to the received voltage signals. The manner in which an image is produced as described below.

In certain embodiments, the graphics processor 44 may, for example, utilize internal memory 46 in performing the functions required by underrun control logic 28. One of the functions of internal memory 46 may be the storage of a look-up table utilized by graphics processor 44 to convert the received data stream (e.g., 24-bit) into a data stream (e.g., 18-bit) for display on the display 18 (e.g., 6-bit).

As previously mentioned, the underrun control logic 28 may include underrun compensation logic 48 that may output underrun pixel data when full pixel data is not available in a memory buffer of the underrun control logic 28. As depicted in FIG. 7, in some embodiments, the underrun compensation logic 48 may include circuitry implemented in the underrun control logic 28. In some embodiments, this circuitry may be implemented as part of the graphics processor 44. Additionally and/or alternatively, the internal memory 46 may store at least a portion of the underrun compensation logic 48 as machine-readable instructions that perform the underrun compensation.

Figure 8:
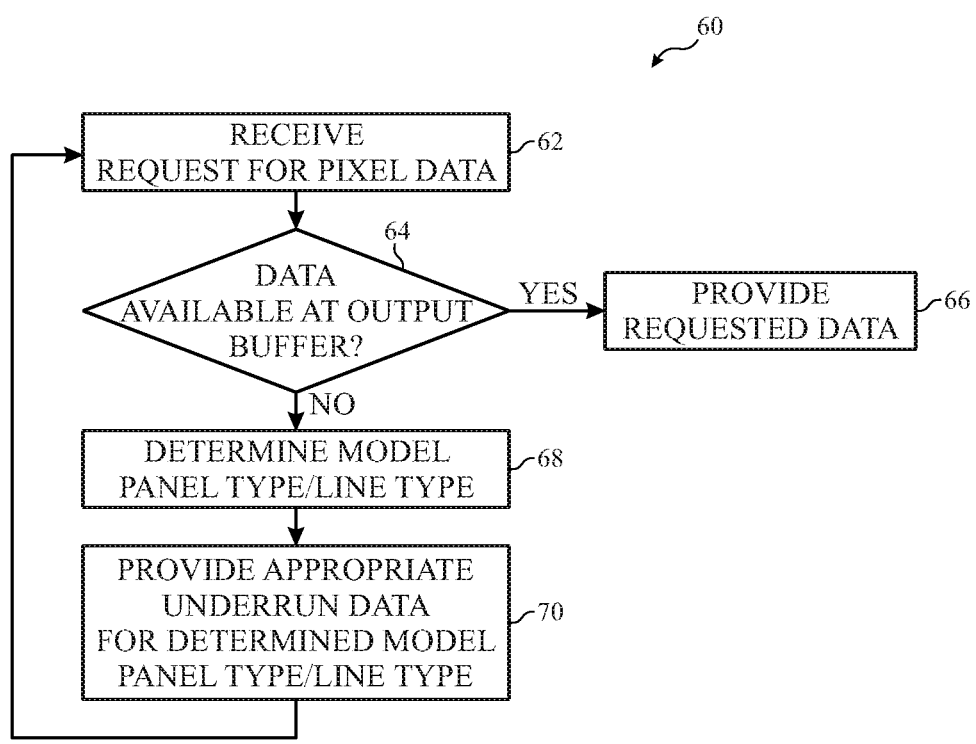
FIG. 8 is a flowchart illustrating a process for dynamic adjustment of underrun outputs, in accordance with an embodiment.

FIG. 8 is a flowchart illustrating a process 60 for dynamic adjustment of underrun outputs, in accordance with an embodiment. The process 60 begins with receiving a request for pixel data (block 62). For example, downstream processing blocks in a display pipeline may request pixel data from upstream processing blocks, such as a dithering processing block and/or a signal processing block, such that additional pixel processing may occur.

A determination is made as to whether full pixel data is available from the upstream output buffer (decision block 64). This determination signals whether an underrun condition is present. When the full pixel data is present, no underrun condition is present and the requested pixel data is provided, as requested (block 66).

However, when not all of the requested pixel data is available, an underrun condition is present. Accordingly, underrun compensation may be provided. For example, as mentioned above, in certain embodiments, the particular compensation to be used may depend upon a determined underrun mode, display panel type, a particular line type for the line associated with the requested pixel data, or a combination thereof. Thus, the underrun mode, display panel type and/or the line type for the requested pixel image data may be determined (block 68).

Based upon the underrun mode, display panel type and/or the line type (e.g., the pixel configuration for the line associated with the requested pixel data), the proper underrun compensation may be provided (block 70). For example, in a first mode, the underrun compensation is set to provide the last valid pixel data as the underrun pixel data. In a second mode, the underrun compensation is set to provide a determined underrun color (e.g., based upon the display type and/or line type), as will be discussed in more detail below.

Figure 9:
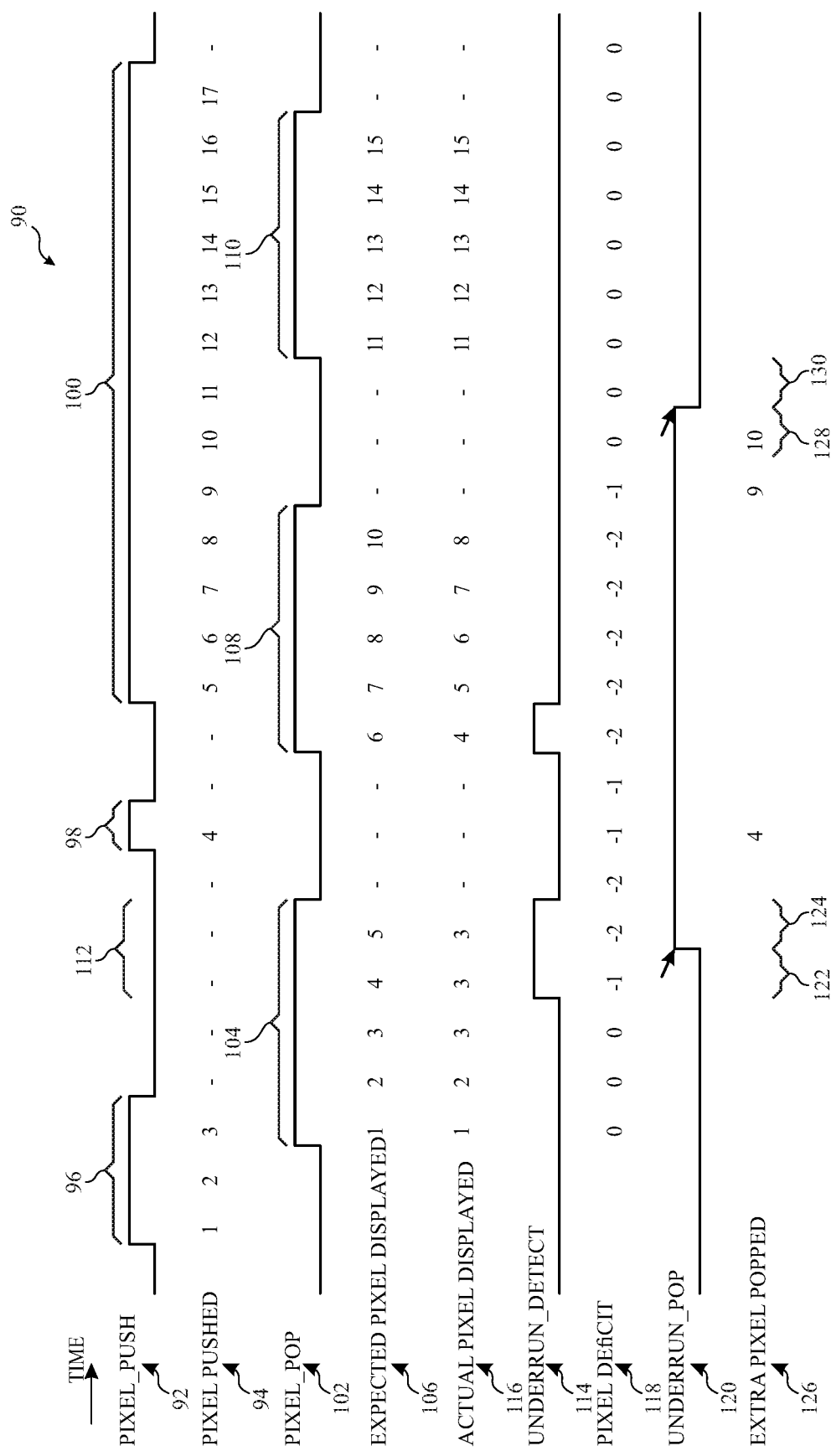
FIG. 9 is a diagram illustrating underrun output timing, in accordance with an embodiment.

FIG. 9 is a diagram illustrating underrun output timing 90, in accordance with an embodiment. As mentioned above, an underrun condition occurs when a pixel is requested without such pixel being available for input, resulting in a pixel data deficit.

The "pixel_push" signal 92 timing illustrates pixels (e.g., pixel data) available for input for downstream processing (e.g., pixel data that is pushed to a memory buffer after processing by upstream processing blocks). "Pixel pushed" indication 94 indicates the pixels that are available based upon the corresponding "pixel_push" signal 92 timing. For example, as illustrated, when the "pixel_push" signal 92 timing is asserted at clock cycle timings 96, pixels 1, 2, and 3 are available (e.g., pushed into a memory buffer). At timing 98, pixel 4 is available. Further, at timing 100, pixels 5-17 are available.

When the "pixel_pop" signal 102 is asserted, pixel data is requested (e.g., popped from the memory buffer). Thus, at clock cycle timing 104, pixels 1-5 are requested/expected, as illustrated by the "expected pixel display" indication 106. Further, at timings 108, pixels 6-10 are requested/expected and at timings 110, pixels 11-15 are requested/expected.

However, as may be appreciated, in some situations, more pixels may be requested than are available. For example, at clock cycle timings 112, pixels 4 and 5 are expected, but are not yet available (e.g., have not yet been pushed to the memory buffer). The "underrun_detect" signal 114 may be asserted every time there is a pixel request without a pixel available, resulting in a pixel deficit. Accordingly, as indicated by the assertion of the "underrun_detect" signal 114, an underrun may be detected at timings 112. The "pixel deficit" indication 118 illustrates a number of deficit pixels based upon the "pixel_push" signal 92 and the "pixel_pop" signal 102.

Upon detection of the pixel deficit, in some embodiments, the last valid pixel data (e.g., pixel 3) may be repeated for the missing pixel data (e.g., pixels 4 and 5 at timings 112) and/or an underrun color may be determined and presented (e.g., based upon the last valid pixel data (e.g., pixel 3), as indicated by the "actual pixel displayed" indicator 116.

To "catch up" with the lost pixels, the pixel data that was not available during the underrun may be popped during a blanking period (e.g., a horizontal blanking period) of the display 18. For example, in the current embodiment, the "underrun_pop" signal 120 may pop extra pixels from the memory buffer when asserted. The "underrun_pop" signal 120 may be asserted one clock cycle after the detection of a pixel deficit. For example, at timing 122, there is a one pixel deficit and at timing 124, the deficit increases to a two-pixel deficit. Because the deficit began at timing 122, the "underrun_pop" signal 120 is asserted at the next clock cycle (e.g., timing 124), resulting in an attempt to pop extra pixels from the memory buffer as they become available. Accordingly, at timing 98, where pixel 4 becomes available, an additional pixel is popped (as indicated by the "extra pixel popped" indicator 126), reducing the pixel deficit to 1. The "underrun_pop" signal 120 may be disserted one clock cycle after a pixel deficiency is removed. For example, in the current example of FIG. 9, the "underrun_pop" signal 120 causes pixel 10 to pop at cycle timing 128, resulting in removal of the pixel deficiency (e.g., as illustrated by the pixel deficit indication 118 indicating 0 at timing 128). In the next clock cycle timing 130, the "underrun_pop" signal 120 is disserted, as no additional pixels are needed to cure a pixel deficit.

Figure 10A:
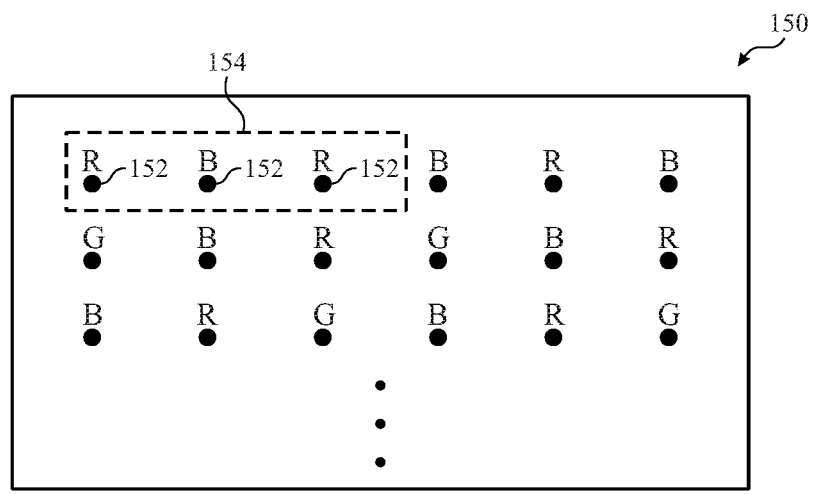
FIGS. 10A and 10B illustrate various display panel pixel configurations and line pixel configurations that may affect underrun data, in accordance with an embodiment.
Figure 10B:
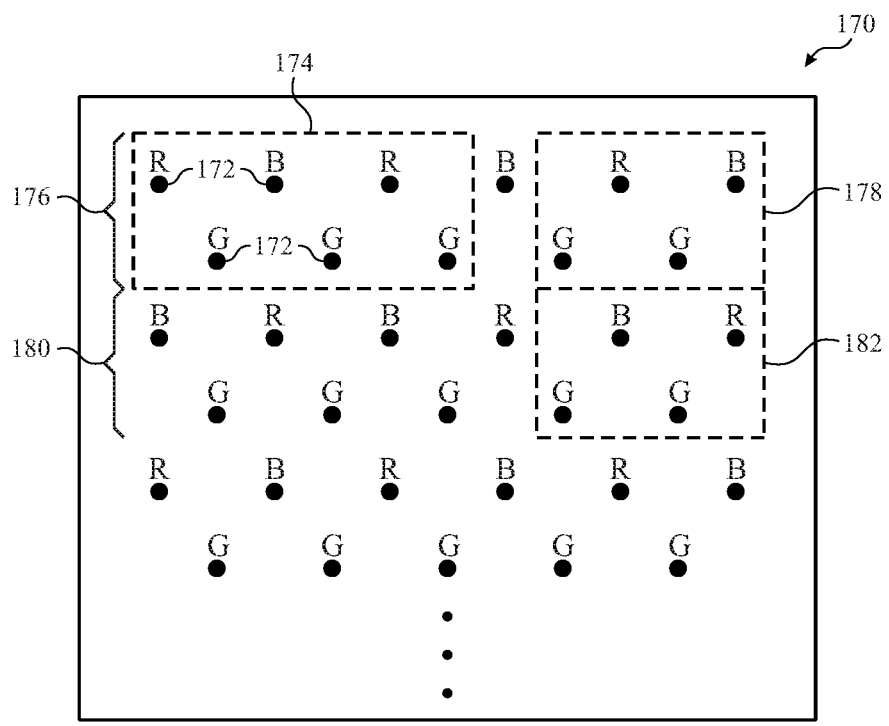

As previously discussed, the pixel configuration (e.g., the display panel's pixel configuration and/or a particular line's pixel configuration) may impact the underrun pixel data provided as an input during underrun conditions. FIGS. 10A and 10B illustrate various display panel pixel configurations and/or varied line pixel configurations that may impact underrun pixel data, in accordance with an embodiment. FIG. 10A illustrates a display panel 150 having Red, Green, Blue (RGB) pixels 152 (e.g., as illustrated by sub-configuration 154). Such a panel configuration may be referred to as RGB configuration. FIG. 10B illustrates a display panel 170 with GRGB or GBGR pixels (e.g., as illustrated by sub-configuration 174. Such panel configurations may be referred to as GRGB or GBGR configurations. In the GRGB and GBGR configurations, each Green value is subsampled with Red or Blue color data, resulting in "GR" and/or "GB" pixel pairs.

The underrun control logic 28 may alter the underrun data based upon a particular pixel configuration used for the display 18. For example, a first set of logic rules may be used for underrun data definition for a display panel 150 having pixels 152 arranged in an RGB configuration, while a second set of logic rules may be used to define underrun data for a display panel 170 having pixels 172 arranged in a GRGB or GBGR configuration. Despite using two sets of rules, the underrun control logic 28 may handle both display types, allowing for one set of underrun control logic that is able to handle both display panels 150 and 170 based upon a dynamic indication of which display panel is being used.

Additionally, in some embodiments, the configuration of pixels of a line may impact the definition of the underrun data. For example, the display panel 170 having the RGBG configuration, alternating lines may end in alternating color configurations. For example, in FIG. 10B, line 176 ends with a Green, Red, Green, Blue (GRGB) configuration 178, while line 180 ends in a Green, Blue, Green, Red (GBGR) configuration 182. In embodiments with odd-width lines, one GR or GB pixel may be missing, when pixels are processed in the pipeline in pairs. According, the pixel configurations of the lines may determine alternative sets of underrun data definition logic to use that inserts derived pixel information into a memory buffer, as will be discussed in more detail below.

Turning now to the logic rules used to define the underrun data, the following embodiment that is disclosed provides handling for both an RGB display panel 150 as well as an GRGB or GBGR configuration display panel 170, as it may be beneficial to support interchangeable display types (e.g., for certain design and/or manufacturing efficiencies, part management efficiencies, etc.). However, in some embodiments, the underrun control logic may support only one display panel type (e.g., only support a GRGB or GBGR configuration display panel 170).

Further, the underrun control logic 28 may support only display panels with even or odd-width lines. However, it may be beneficial to support interchangeable configurations. Accordingly, the underrun control logic 28 may support both display panels with even-width lines and display panels with odd-width lines.

Below is pseudo-code, divided into portions for discussion, illustrating one manner of defining underrun data for both RGB and GRGB or GBGR configuration display panel types for both even-width and odd-width lines. A conditional statement is used to distinguish which rules to use, based upon a display panel type. For example, a first set of underrun definition rules are used for RGB panels, which is provided below. For RGB configuration panels, the underrun components may be drawn from the last RGB pixel.

As previously discussed, in certain embodiments, two pixels per clock cycle may be processed. Accordingly, the below pseudocode illustrates pixel pairs "output from pipe" from the upstream pipeline, where the final pixel is not ready/valid. Further, the "pushed into OutputFIFO" illustrates the valid pixel data with applied underrun data, to compensate for final pixel that is not ready/valid.

if (PanelType==RGB)//RGB pixels
  if ((W % 2)==0)//W, the frame width is even; coordinate range=[0, W−1]
    output from Pipe: . . .
      {(R[W-4],G[W-4],B[W-4])  (R[W-3],G[W-3],B[W-3])}
      {(R[W-2],G[W-2],B[W-2])  (R[W-1],G[W-1],B[W-1])}
    pushed into OutputFIFO:
      {(R[W-4],G[W-4],B[W-4])  (R[W-3],G[W-3],B[W-3])}
      {(R[W-2],G[W-2],B[W-2])  (R[W-1],G[W-1],B[W-1])}
  else//W, the frame width is odd; coordinate range=[0, W-1]
    output from Pipe:
      {(R[W-3],G[W-3],B[W-3])  (R[W-2],G[W-2],B[W-2])}
      {(R[W-1],G[W-1],B[W-1])  (X[W],X[W],X[W])}
    pushed into OutputFIFO:
      {(R[W-3],G[W-3],B[W-3])  (R[W-2],G[W-2],B[W-2])}
      {(R[W-1],G[W-1],B[W-1])  (R[W-1],G[W-1],B[W-1])}

As may be appreciated from the above pseudo-code, the underrun data may be defined differently based upon whether the line/frame-width is even or odd. When the width is even (e.g., as determined by W %2==0 in the current embodiment) and the coordinate range is from 0 to W−1, the output from the pipe and the data pushed into the memory buffer are the same, as the pixel pairs define the even-width line.

However, when the width is odd (e.g., when W %2 !=0 in the current embodiment), the data for the last pixel of the odd-width line may not be received in the last pixel pair (e.g., is outside the range W-1), as illustrated by the pixel (X[W],X[W],X[W]). Accordingly, the last valid pixel data may be repeated for inserting into the output memory buffer. Thus, the data pushed into the memory buffer is (R[W-1],G[W-1],B[W-1]) instead of (X[W],X[W],X[W]).

A second set of underrun definition rules may be used for RGRB panels. A representation of such rules is provided in the pseudocode below, starting first with a condition that the panel is a GRGB or GBGR configuration panel.

if (PanelType==GRGB or GBGR)//i.e. sub-sampled pixels with GR or GB per pixel

As above, the rules may be varied based upon a determination of whether the width is even (e.g., W %2==0) or odd (W %2!=0).

The portion below illustrates the underrun data definition rules for even-width frames/lines. For panels with GRGB or GBGR configurations, for even width frame lengths, the underrun components from the second half of the last pixel pair. For example, the underrun Green component is derived from the second half of the last pixel pair. Blue is derived from the second half of the last pixel pair in the GRGB types and the first half of the last pixel pair in GBGR types. Red is derived from the first half of the last pixel pair in the GRGB types and the second half of the last pixel pair in GBGR types.

As illustrated in the pseudocode, when an R sample is on the first pixel of the row, the output from the pipe is:

{(R[W-4],G[W-4],B[W-3]) (R[W-4],G[W-3],B[W-3])}
{(R[W-2],G[W-2],B[W-1]) (R[W-2],G[W-1],B[W-1])}

The data pushed into the memory buffer is the same, as the pixel pairs provide enough information for the even-width display panel. Accordingly, the data pushed to the memory buffer is:

{(R[W-4],G[W-4],B[W-3]) (R[W-4],G[W-3],B[W-3])}
{(R[W-2],G[W-2],B[W-1]) (R[W-2],G[W-1],B[W-1])}

For rows with a Blue sample on the first pixel, the output from the pipeline is:

{(R[W-3],G[W-4],B[W-4]) (R[W-3],G[W-3],B[W-4])}
{(R[W-1],G[W-2],B[W-2]) (R[W-1],G[W-1],B[W-2])}

The data pushed into the memory buffer is the same, as the pixel pairs provide enough information for the even-width display panel. Accordingly, the data pushed to the memory buffer is:

{(R[W-3],G[W-4],B[W-4]) (R[W-3],G[W-3],B[W-4])}
{(R[W-1],G[W-2],B[W-2]) (R[W-1],G[W-1],B[W-2])}

For panels with GRGB or GBGR configurations, the underrun derivations are the same, except when underron occurs at the beginning of a line. In such a case, only the first half of the last pixel pair is valid, so the Green component comes from the valid half of the pixel pair. If the valid half of the last valid pixel is a GB pixel then the blue component comes from the valid GB pixel. Otherwise, the Blue component comes from the second half of the second to last pixel pair (e.g., the last valid GB pixel). Similarly, if the valid last half of the last valid pixel is a GR pixel, then the red component comes from the valid GR pixel. Otherwise, the Red component comes from the second half of the second to last pixel pair (e.g., the last valid GR pixel).

This following portion of the pseudocode illustrate the underrun data definition for odd-width frames/lines. As illustrated below, the varied pixel configurations per line may also be accounted for. For example, depending on the line's pixel configuration, the line may have one more Red pixel than Blue pixel or may have one more Blue pixel than Red pixel. The below pseudocode illustrates a definition of underrun data for each of the scenarios.

For rows with more Blue samples than red samples (e.g., (W/2) Red samples and (W/2)+1 Blue samples), the output from the pipe is missing one of the GR pixels from the pixel pair, resulting missing Red and Green pixel data for the last GR/GB pixel pair (illustrated by the X's). Accordingly, the output from the pipeline is:

{(R[W-2],G[W-3],B[W-3]) (R[W-2],G[W-2],B[W-3])}
{(X[W],G[W-1],B[W-1]) (X[W],X[W],B[W-1])}

The data pushed into the memory buffer includes underrun data for the missing pixel data, using the most recent valid pixel data. Accordingly, the data pushed into the memory buffer, which uses the last valid color component data to compensate for the underrun (e.g., the data including the valid pixel data and the underrun pixel data), is:

{(R[W-2],G[W-3],B[W-3]) (R[W-2],G[W-2],B[W-3])}
{(R[W-2],G[W-1],B[W-1]) (R[W-2],G[W-1],B[W-1])}

For rows where there are more Red samples than Blue samples (e.g., when there are (W/2) B samples and W/2+1 Red samples), the final GB pixel data is missing for the final GR/GB pixel pair (illustrated by the X's), accordingly, output from the pipeline is:

{(R[W-3],G[W-3],B[W-2]) (R[W-3],G[W-2],B[W-2])}
{(R[W-1],G[W-1],X[W]) (R[W-1],X[W],X[W])}

The data pushed into the memory buffer includes underrun data for the missing pixel data, using the most recent valid pixel data. Accordingly, the data pushed into the memory buffer, which uses the last valid color component data to compensate for the underrun (e.g., the data including the valid pixel data and the underrun pixel data) is:

{(R[W-3],G[W-3],B[W-2]) (R[W-3],G[W-2],B[W-2])}
{(R[W-1],G[W-1],B[W-2]) (R[W-1],G[W-1],B[W-2])}

Figure 11A:
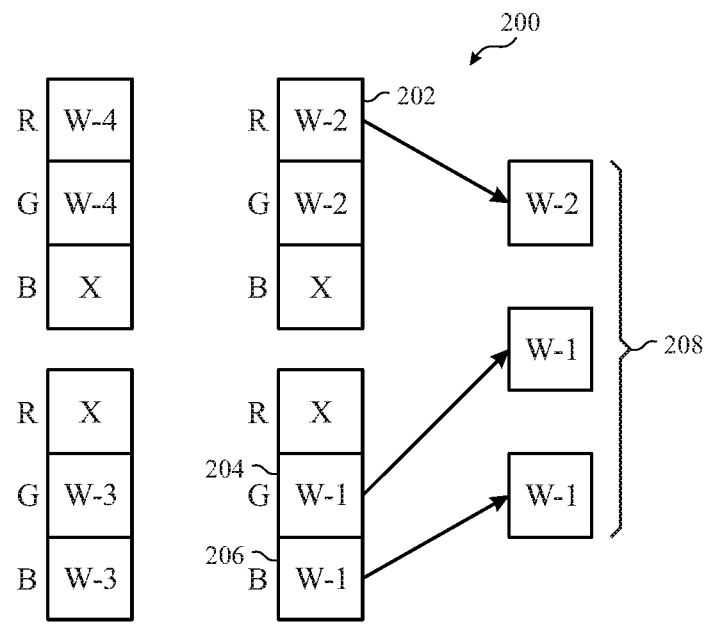
FIGS. 11A and 11B illustrate color underrun definition for a Green, Red, Green, Blue (GRGB) line configurations, in accordance with an embodiment.

FIG. 11A is a diagram 200 illustrating color underrun definition for a Green, Red, Green, Blue (GRGB) line configuration, for an even-width line/frame, in accordance with an embodiment. In the embodiment depicted in FIG. 11A, two pixels are provided per clock cycle. As mentioned above, underrun pixel data is determined by using the last valid pixel data for each color component. For even-width lines, GR and GB pixel pairs exist for each of the pixels of the line. The underrun pixel (W) is determined using the last valid pixel component data. Accordingly, the R(W-2) data 202, the G(W-1) data 204, and the B(W-1) data 206 are used to define the underrun pixel data 208.

Figure 11B:
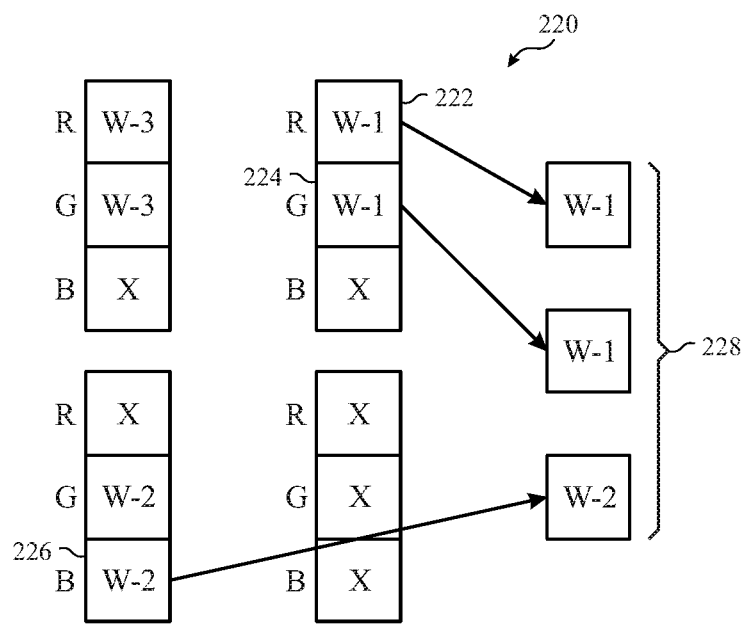

FIG. 11B is a diagram 220 illustrating color underrun definition for a Green, Red, Green, Blue (GRGB) line configuration, for an odd-width line/frame, in accordance with an embodiment. In the embodiment depicted in FIG. 11B, two pixels are provided per clock cycle. As mentioned above, underrun pixel data is determined by using the last valid pixel data for each color component. For odd-width lines, a GR or GB pixel from the last GR/GB pixel pair is missing. For GRGB lines (e.g., lines leading with a GR pixel and/or ending with a GB pixel), the last GB pixel data is missing. As mentioned above, the underrun pixel (W) is determined using the last valid pixel component data. Accordingly, the R(W-1) data 222, the G(W-1) data 224, and the B(W-2) data 226 are used to define the underrun pixel data 228.

Figure 12A:
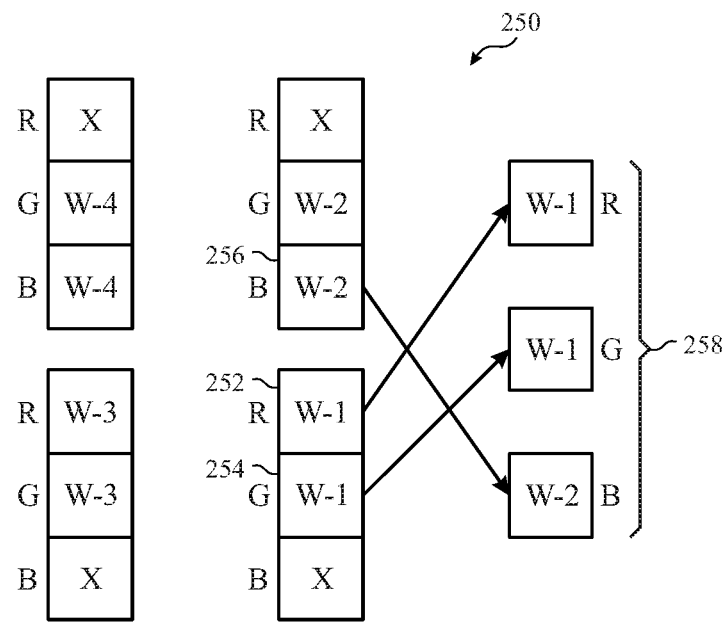
FIGS. 12A and 12B illustrate color underrun definition for a Green, Blue, Green, Red (GBGR) line configuration, in accordance with an embodiment.

FIG. 12A is a diagram 250 illustrating color underrun definition for a Green, Blue, Green, Red (GBGR) line configuration, for an even-width line/frame, in accordance with an embodiment. In the embodiment depicted in FIG. 12A, two pixels are provided per clock cycle. As mentioned above, underrun pixel data is determined by using the last valid pixel data for each color component. For even-width lines, GR and GB pixel pairs exist for each of the pixels of the line. The underrun pixel (W) is determined using the last valid pixel component data. Accordingly, the R(W-1) data 252, the G(W-1) data 254, and the B(W-1) data 256 are used to define the underrun pixel data 258.

Figure 12B:
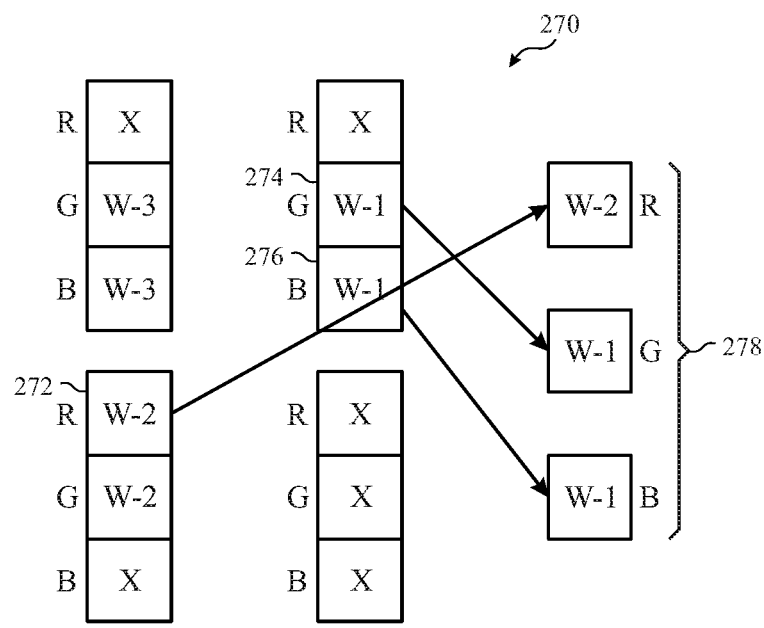

FIG. 12B is a diagram 270 illustrating color underrun definition for a Green, Blue, Green, Red (GBGR) line configuration, for an odd-width line/frame, in accordance with an embodiment. In the embodiment depicted in FIG. 12B, two pixels are provided per clock cycle. As mentioned above, underrun pixel data is determined by using the last valid pixel data for each color component. For odd-width lines, a GR or GB pixel from the last GR/GB pixel pair is missing. For GBGR lines (e.g., lines leading with a GB pixel and/or ending with a GR pixel), the last GR pixel data is missing. As mentioned above, the underrun pixel (W) is determined using the last valid pixel component data.

Accordingly, the R(W-2) data 272, the G(W-1) data 224, and the B(W-1) data 276 are used to define the underrun pixel data 278.

While the various embodiments may be susceptible to various modifications and alternative forms, specific embodiments have been shown by way of example in the drawings and have been described in detail herein. However, it should be understood that the claims are not intended to be limited to the particular forms disclosed. Rather, the claims are to cover all modifications, equivalents, and alternatives falling within the spirit and scope of the disclosure

What is claimed is:

1. A system, comprising:
   an image processing pipeline configured to receive and process first image data, generating processed image data;
   a display comprising a particular one of a plurality of pixel configurations, wherein
      each of the plurality of pixel configurations comprises a color arrangement pattern of pixels of the each pixel configuration, and
      the display is configured to present the processed image data; and
   underrun control logic configured to:
   determine the particular one of the plurality of pixel configurations among the plurality of pixel configurations;
   detect an underrun condition during processing of the first image data via the image processing pipeline, wherein at least a portion of requested image data for downstream processing has not yet been provided by an upstream processing component; and
   upon detecting an underrun condition, generate underrun pixel data for at least the portion of the requested image data, based upon a color arrangement pattern of pixels of the particular one of the plurality of pixel configurations, wherein the underrun pixel data comprises a first value for a first one of the plurality of pixel configurations and comprises a second value different than the first value for a second one of the plurality of pixel configurations.

2. The system of claim 1, wherein the plurality of pixel configurations comprise a first panel pixel configuration and a second panel pixel configuration, the first panel pixel configuration comprising a Red, Green, Blue (RGB) pixel configuration and the second panel pixel configuration comprising a Green, Red, Green, Blue (GRGB) or Green, Blue, Green, Red (GBGR) pixel configuration.

3. The system of claim 2, wherein when the particular one of the plurality of pixel configurations is the first panel pixel configuration, the underrun pixel data is defined by a last valid RGB pixel value of the first image data.

4. The system of claim 2, wherein when the particular one of the plurality of pixel configurations is the second panel pixel configuration, the underrun pixel data is defined by a last valid red component value, a last valid green component value, and a last valid blue component value from a last valid pair of GR and GB pixel data of the first image data.

5. The system of claim 1, wherein the image processing pipeline is configured to process a multiple of two pixels per clock cycle.

6. The system of claim 5, wherein the plurality of pixel configurations comprise a first line pixel configuration of an even length of pixels and a second line pixel configuration of an odd length of pixels.

7. The system of claim 6, wherein when the particular one of the plurality of pixel configurations is the first line pixel configuration of an even length of pixels, the underrun pixel data is defined by a last valid RGB pixel value, or a last set of valid GR and GB pixel values of the first image data.

8. The system of claim 6, wherein when the particular one of the plurality of pixel configurations is the second line pixel configuration of an odd length of pixels and the display comprises a panel pixel configuration comprising a Red, Green, Blue (RGB) pixel configuration, the image processing pipeline is configured to define a last valid pixel pushed to an output memory buffer by last valid RGB pixel data provided from the image processing pipeline.

9. The system of claim 6, wherein when the particular one of the plurality of pixel configurations is the second line pixel configuration of an odd length of pixels and the display comprises a panel pixel configuration comprising a Green, Red, Green, Blue (GRGB) or a Green, Blue, Green, Red (GBGR) pixel configuration, the image processing pipeline is configured to define at least a portion of a last valid pixel pair pushed to an output memory buffer by a corresponding portion of a last valid set of a combination of two GR and GB pixel data provided from the image processing pipeline.

10. The system of claim 9, wherein the last valid set of a combination of two GR and GB pixel data comprises pixel data for a second to last valid GB pixel and a last valid GR pixel when there is an additional red pixel, as opposed to an additional blue pixel, in a current line where the underrun condition occurs.

11. The system of claim 9, wherein the last valid set of a combination of two GR and GB pixel data comprises pixel data for a second to last GR pixel and a last GB pixel when there is an additional blue pixel, as opposed to an additional red pixel, in a current line where the underrun condition occurs.

12. A tangible, non-transitory, machine-readable medium, comprising machine-readable instructions to cause:
   determining a particular one of a plurality of pixel configurations for a display among the plurality of pixel configurations, each of the plurality of pixel configurations comprising a color arrangement pattern of pixels of the each pixel configuration;
   detecting an underrun condition during processing of first image data via an image processing pipeline, where an at least portion of requested image data for downstream processing has not yet been provided by an upstream processing component; and
   upon detecting an underrun condition, generating underrun pixel data for the at least portion of the requested image data, based upon a color arrangement pattern of pixels of the particular one of the plurality of pixel configurations, wherein the underrun pixel data comprises a first value for a first one of the plurality of pixel configurations and comprises a second value different than the first value for a second one of the plurality of pixel configurations.

13. The machine-readable medium of claim 12, wherein the instructions comprise instructions to:
   when the display comprises a pixel configuration comprising a Green, Red, Green, Blue (GRGB)) or Green, Blue, Green, Red (GBGR) sequence of pixels and an odd-number of lines, generate the underrun pixel data using a combination of two valid pixels comprising GR and GB pixels.

14. The machine-readable medium of claim 13, wherein the instructions comprise instructions to:
   when the pixel configuration comprises the GRGB or GBGR sequence of pixels and a current line of the display comprises an additional red pixel, as opposed to an additional blue pixel, such that a last GB pixel prior to an underrun is invalid:
  obtain a blue component value for the underrun pixel data from a blue component of a second to last valid pixel of the first image data;
  obtain a red component value for the underrun pixel data from a red component value of a last valid pixel of the first image data; and
  obtain a green component value for the underrun pixel data from a green component value of the last valid pixel of the first image data.

15. The machine-readable medium of claim 13, wherein the instructions comprise instructions to:
  when the pixel configuration comprises a GRGB or GBGR sequence and a current line of the display comprises an additional blue pixel, as opposed to an additional red pixel, such that a last GR pixel prior to an underrun is invalid:
    obtain a red component value for the underrun pixel data from a red component of a second to last valid pixel of the first image data;
    obtain a blue component value for the underrun pixel data from a blue component of a last valid pixel of the first image data; and
    obtain a green component value for the underrun pixel data from a green component value of the last valid pixel of the first image data.

16. The machine-readable medium of claim 13, wherein the instructions comprise instructions to:
  when the display comprises a pixel configuration comprising a Red, Green, Blue (RGB) sequence of pixels and an odd-number of lines, generate the underrun pixel data using a last valid pixel of the first image data.

17. Underrun control circuitry configured to:
  determine a particular one of a plurality of line pixel configurations of current line of a display panel among the plurality of line pixel configurations, wherein
    each of the plurality of line pixel configurations comprises a color arrangement pattern of pixels of the each line pixel configuration, and
    the particular one of the plurality of line pixel configurations comprises an even-width line pixel configuration or an odd-width line pixel configuration;
  detect an underrun condition during processing of first image data via an image processing pipeline, wherein at least a portion of requested image data for downstream processing has not yet been provided by an upstream processing component; and
  upon detecting an underrun condition, generate underrun pixel data for at least the portion of the requested image data, based upon a color arrangement pattern of pixels of the particular one of the plurality of line pixel configurations.

18. The underrun control circuitry of claim 17, configured to:
  generate the underrun pixel data for the at least portion of the requested image data based upon whether the current line has a larger number of blue pixels as opposed to red pixels or a larger number of red pixels as opposed to blue pixels.

19. The underrun control circuitry of claim 18, configured to:
  when the current line has a larger number of blue pixels as opposed to red pixels, such that an invalid red component exists prior to an underrun:
    obtain a red component value for the underrun pixel data from a red component of a second to last valid pixel of the first image data;
    obtain a blue component value for the underrun pixel data from a blue component of a last valid pixel of the first image data; and
    obtain a green component value for the underrun pixel data from a green component value of the last valid pixel of the first image data; and
  when the current line has a larger number of red pixels as opposed to blue pixels:
    obtain a blue component value for the underrun pixel data from a blue component of the second to last valid pixel of the first image data;
    obtain a red component value for the underrun pixel data from a red component value of the last valid pixel of the first image data; and
    obtain a green component value for the underrun pixel data from a green component value of the last valid pixel of the first image data.

20. The underrun control circuitry of claim 17, configured to:
  determine a particular one of a plurality of pixel configurations of a display panel, the particular one of the plurality of pixel configurations comprising either a GRGB pixel configuration comprising a Green, Red, Green, Blue (GRGB) sequence of pixels, a GBFR pixel configuration comprising a Green, Blue, Green, Red (GBGR) sequence of pixels, or an RGB pixel configuration comprising a Red, Green, Blue (RGB) sequence of pixels; and
  generate the underrun pixel data for the at least portion of the requested image data based upon the particular one of the plurality of pixel configurations of the display panel.

* * * * *